(12) United States Patent
Mayer (10) Patent No.: US 7,193,000 B2
(45) Date of Patent: Mar. 20, 2007

(54) COMPOSITIONS FOR USE IN GOLF BALLS (75) Inventor: Joseph B. Mayer, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 54 days.

(21) Appl. No.: 10/845,924

(22) Filed: May 15, 2004

(65) Prior Publication Data

US 2005/0255942 A1    Nov. 17, 2005

(51) Int. Cl.
A63B 37/06    (2006.01)
C08K 5/43    (2006.01)

(52) U.S. Cl. .................... 524/169; 524/197; 525/126; 525/274; 473/371

(58) Field of Classification Search .................... None
See application file for complete search history.

(56) References Cited

U.S. PATENT DOCUMENTS

| | | | |
|---|---|---|---|
| 3,989,568 A * | 11/1976 | Isaac ........................... 156/182 |
| 4,650,193 A | 3/1987 | Molitor et al. ............... 273/228 |
| 4,715,607 A | 12/1987 | Llort et al. .................. 473/372 |
| 4,792,141 A | 12/1988 | Llort .......................... 473/378 |
| 4,931,376 A | 6/1990 | Ikematsu et al. ........... 430/164 |
| 4,974,852 A | 12/1990 | Hiraoka et al. ............. 473/372 |
| 5,028,674 A | 7/1991 | Hatch et al. ................ 526/216 |
| 5,252,652 A | 10/1993 | Egashira et al. ............ 524/392 |
| 5,273,286 A | 12/1993 | Sun ............................. 273/228 |
| 5,306,760 A | 4/1994 | Sullivan ..................... 524/400 |
| 5,314,187 A | 5/1994 | Proudfit ...................... 473/373 |
| 5,585,440 A | 12/1996 | Yamada et al. ............. 525/193 |
| 5,688,191 A | 11/1997 | Cavallaro et al. ........... 473/373 |
| 5,692,974 A | 12/1997 | Wu et al. .................... 473/377 |
| 5,697,856 A | 12/1997 | Moriyama et al. .......... 473/374 |
| 5,731,371 A | 3/1998 | Nesbitt et al. ............... 524/11 |
| 5,733,206 A | 3/1998 | Nesbitt et al. ............... 473/377 |
| 5,743,816 A | 4/1998 | Ohsumi et al. ............. 473/376 |
| 5,772,531 A | 6/1998 | Ohsumi et al. ............. 473/376 |
| 5,783,293 A | 7/1998 | Lammi ....................... 428/212 |
| 5,803,831 A | 9/1998 | Sullivan et al. ............. 473/374 |
| 5,810,678 A | 9/1998 | Cavallaro et al. ........... 473/373 |
| 5,816,937 A | 10/1998 | Shimosaka et al. ......... 473/354 |
| 5,816,944 A | 10/1998 | Asakura et al. ............. 473/372 |
| 5,885,172 A | 3/1999 | Hebert et al. ............... 473/354 |
| 5,895,105 A * | 4/1999 | Nesbitt ........................ 525/193 |
| 5,902,855 A | 5/1999 | Sullivan ..................... 525/221 |
| 5,919,100 A | 7/1999 | Boehm et al. ............... 473/354 |
| 5,947,842 A | 9/1999 | Cavallaro et al. ........... 473/373 |
| 5,952,415 A | 9/1999 | Hwang ........................ 524/399 |
| 5,965,669 A | 10/1999 | Cavallaro et al. ........... 525/221 |
| 5,976,443 A | 11/1999 | Nesbitt et al. ............... 264/250 |
| 5,998,506 A | 12/1999 | Nesbitt ........................ 523/219 |
| 6,018,003 A | 1/2000 | Sullivan et al. .......... 525/333.8 |
| 6,056,842 A | 5/2000 | Dalton et al. ............... 156/243 |
| 6,068,561 A | 5/2000 | Renard et al. .............. 473/364 |
| 6,083,119 A | 7/2000 | Sullivan et al. ............. 473/354 |
| 6,099,416 A | 8/2000 | Sullivan et al. ............. 473/378 |
| 6,113,831 A | 9/2000 | Nesbitt et al. ............... 264/250 |
| 6,117,025 A | 9/2000 | Sullivan ..................... 473/373 |
| 6,132,324 A | 10/2000 | Hebert et al. ............... 473/378 |
| 6,139,447 A | 10/2000 | Ohama ........................ 473/378 |
| 6,152,834 A | 11/2000 | Sullivan ..................... 473/365 |
| 6,162,135 A | 12/2000 | Bulpett et al. .............. 473/373 |
| 6,180,040 B1 | 1/2001 | Ladd et al. .................. 264/248 |
| 6,184,301 B1 | 2/2001 | Shindo et al. ............... 525/261 |
| 6,210,293 B1 | 4/2001 | Sullivan ..................... 473/374 |
| 6,241,626 B1 | 6/2001 | Sullivan et al. ............. 473/377 |
| 6,244,977 B1 | 6/2001 | Sullivan et al. ............. 473/372 |
| 6,284,840 B1 | 9/2001 | Rajagopalan et al. ......... 525/92 |
| 6,287,217 B1 | 9/2001 | Sullivan et al. ............. 473/374 |
| 6,291,592 B1 | 9/2001 | Bulpett et al. .............. 524/248 |
| 6,299,550 B1 | 10/2001 | Molitor et al. .............. 473/354 |
| 6,303,704 B1 | 10/2001 | Nesbitt ..................... 525/333.8 |
| 6,309,314 B1 | 10/2001 | Sullivan et al. ............. 473/378 |
| 6,315,680 B1 | 11/2001 | Dalton et al. ............... 473/373 |
| 6,339,119 B1 | 1/2002 | Ladd et al. .................. 524/336 |
| 6,355,715 B1 | 3/2002 | Ladd et al. .................. 524/432 |
| 6,432,342 B1 | 8/2002 | Nesbitt et al. ............... 264/250 |
| 6,465,578 B1 | 10/2002 | Bissonnette et al. ........ 525/261 |
| 6,468,168 B1 | 10/2002 | Nesbitt et al. ............... 473/357 |
| 6,475,417 B2 | 11/2002 | Nesbitt et al. ............... 264/134 |
| 6,489,401 B2 | 12/2002 | Endo .......................... 525/193 |
| 6,525,141 B2 | 2/2003 | Kataoka ...................... 525/261 |
| 6,566,483 B2 | 5/2003 | Cho et al. ................... 528/129 |
| 6,635,716 B2 | 10/2003 | Voorheis et al. ............ 525/261 |
| 6,652,943 B2 | 11/2003 | Tukachinsky et al. ... 428/36.91 |
| 6,653,382 B1 | 11/2003 | Statz et al. .................. 524/400 |
| 6,695,716 B2 | 2/2004 | Higuchi et al. ............. 473/357 |
| 2001/0009310 A1 | 7/2001 | Hebert et al. ............... 264/129 |
| 2002/0019268 A1 | 2/2002 | Tsunoda et al. ............ 473/351 |
| 2002/0052253 A1 | 5/2002 | Fushihara et al. .......... 473/371 |
| 2003/0050373 A1 | 3/2003 | Chen .......................... 524/322 |
| 2003/0114565 A1 | 6/2003 | Chen et al. ................. 524/322 |
| 2003/0130396 A1 | 7/2003 | Voorheis et al. ............ 524/392 |
| 2003/0130434 A1 | 7/2003 | Statz et al. ............... 525/329.5 |
| 2003/0158327 A1* | 8/2003 | Han et al. ................... 524/589 |
| 2003/0207998 A1 | 11/2003 | Voorheis et al. ............ 525/261 |
| 2004/0219995 A1* | 11/2004 | Sullivan ..................... 473/371 |
| 2005/0075469 A1* | 4/2005 | Feng .......................... 528/44 |

* cited by examiner

FOREIGN PATENT DOCUMENTS

GB    1265596    *    3/1972
JP    60106469    *    6/1985

Primary Examiner—David J. Buttner
(74) Attorney, Agent, or Firm—Mandi B. Milbank (57) ABSTRACT

A golf ball comprising a core and a cover is disclosed. At least a layer of the golf ball is made from an elastomer composition comprising a least one polydiene rubber and at least one moisture scavenger, such as p-toluene sulfonyl isocyanate. The moisture scavenger is generally present in the elastomer composition in an amount of 10 phr or less, and particularly from 0.1 to 5 phr, by weight of the elastomer.

1 Claim, 2 Drawing Sheets

COMPOSITIONS FOR USE IN GOLF BALLS

FIELD OF THE INVENTION

This disclosure generally relates to golf balls with high coefficient of restitution, and more particularly to a high coefficient of restitution golf ball comprising a moisture scavenger.

BACKGROUND

Golf balls have been designed to provide particular playing characteristics. These characteristics generally include initial ball velocity, coefficient of restitution (CoR), compression, weight distribution and spin of the golf ball, which can be optimized for various types of players.

Golf balls can generally be divided into two classes: solid and wound. Solid golf balls include single-layer, dual-layer (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric thread, and a cover.

Generally, the hardness of a golf ball or a golf ball core is one among other factors used in designing golf balls. Typically, when a ball is hard, e.g., possessing high compression values and low deformation when struck by a club, it typically has high CoR and high initial velocity after impact with a golf club. However, hard ball has a "hard" feel and is difficult to control on the greens. A softer ball, e.g., lower compression value and high deformation, has a "soft" feel and is easier to control with short iron clubs for greenside play. Recently developed solid balls have a core, at least one intermediate layer, and a cover. The intermediate layer improves other playing characteristics of solid balls, and can be made from thermoset or thermoplastic materials.

Recent advancements in golf ball design can produce golf balls with low compression for soft "feel" and high CoR for long flight distance. The CoR for low compression balls, however, decreases at higher impact speed with golf clubs.

Hence, there remains a need in the art for low compression golf balls that have high coefficient of restitution at low impact speeds and at high impact speeds.

SUMMARY

The present disclosure is directed to golf balls having high coefficient of restitution and other feel and control characteristics. The golf ball can comprise at least one elastomer composition comprising at least one polydiene rubber and at least one moisture scavenger, such as water-reactive desiccant like isocyanate-containing compound, and nonreactive materials. The isocyanate-containing compound can be chosen from monomeric compounds or monoisocyanates such as p-tolune sulfonyl isocyanate, polymeric compounds or polyisocyanates such as polymeric methylene diphenyl diisocyanate, and diisocyanates. Other moisture scavengers include oxazolidines, oxazolanes, orthoformates, orthoacetates, alkyl esters of toluene sulfonic acid, and vinyl silanes. The moisture scavenger can be present in an amount of 10 phr or less by weight of the elastomer, such as 0.1–5 phr.

The elastomer composition can at least in part form at least one portion of the golf ball chosen from inner center, core, inner core layer, intermediate core layer, outer core layer, intermediate layer, cover, inner cover layer, intermediate cover layer, and outer cover layer. The crosslinkable material can be thermoplastic or thermoset, chosen from polyolefins, polyamides, polyesters, fluoropolymers, silicones, ionomers, and mixtures thereof. The polyolefin can be chosen from polydienes, polyethylenes, ethylene-propylene copolymers, ethylene-butylene copolymers, polyisoprenes, polybutadienes, polystyrenebutadienes, polyethylenebutadienes, ethylene-propylenediene terpolymers, and mixtures thereof; the fluoropolymer is chosen from fluorinated ethylene-propylene copolymers and fluorinated ethylene-propylene-diene terpolymers. The elastomer composition can further comprise at least one co-crosslinking agent, at least one crosslinking initiator, and/or at least one organosulfur compound.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION

Initial velocity of a golf ball after impact with a golf club is governed by the United States Golf Association ("USGA"). The USGA requires that a regulation golf ball can have an initial velocity of no more than 250 ft/s±2% or 255 ft/s. The USGA initial velocity limit is related to the ultimate distance that a ball may travel (280 yards±6%), and is also related to the coefficient of restitution ("CoR"). The coefficient of restitution is the ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, golf ball manufacturers are interested in this characteristic for designing and testing golf balls.

One conventional technique for measuring CoR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $CoR=T_{out}/T_{in}$.

Another CoR measuring method uses a titanium disk. The titanium disk intending to simulate a golf club is circular, and has a diameter of about 4 inches, and has a mass of about 200 grams. The impact face of the titanium disk may also be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. CoR can be calculated from the ratio of the outgoing time period to the incoming time period along with the mass of the disk and ball:

$$CoR = \frac{(T_{out}/T_{in}) \times (M_e + M_b) + M_b}{M_e}$$

Solid golf balls with soft cores have been utilized to provide balls with good feel for better control. Recently, a soft core has been developed that is also capable of high initial velocity when impacted by a high velocity driver club. Such technology is discussed in commonly owned co-pending patent application entitled "Low Spin, Soft Compression, Performance Golf Ball", bearing Ser. No. 10/657,021 and filed on Sep. 5, 2003 (the '021 application). The disclosure of the '021 application is incorporated herein by reference in its entirety. An example of such technology is a core formed of polybutadiene rubber with Mooney viscosity of about 40 to about 60. The core can have at least one organosulfur additive, such as zinc pentachlorothiophenol (ZnPCTP) or pentachlorothiophenol (PCTP), to improve feel and to improve the velocity of the ball after impact at low compression. The compression of such core can be less than 60 PGA, such as 20 to 60, or 30 to 60.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is referred to as Atti or PGA compression, and is approximately related to Riehle compression through the following equation: Atti or PGA compression=(160–Riehle Compression). Thus, a Riehle compression of 100 would be the same as an Atti compression of 60.

Golf balls made with the soft cores above enjoy high CoR at relatively low club speeds. The CoR of these balls is higher than the CoR of similar balls with higher compression cores at relatively low club speeds. At higher club speeds, however, the CoR of golf balls with low compression cores can be lower than the CoR of balls with higher compression cores. To demonstrate, a first golf ball with a 1.505 inch core and a core compression of 48 (hereinafter "Sample-48") and a second golf ball with a 1.515 inch core and a core compression of 80 (hereinafter "Sample-80") were subjected to various distance and CoR tests. As the data of Table I below illustrate, Sample-48 and Sample-80 have essentially the same size core and similar dual-layer cover. The single most significant difference between these two balls is the compression of the respective cores.

TABLE I

|  |  | Sample-48 | Sample-80 | ΔCoR |
|---|---|---|---|---|
|  | Compression On Ball | 86 | 103 |  |
| Ball | Average Driver Set-up | 141.7 | 141.5 |  |
| Speed | Standard Driver Set-up | 162.3 | 162.1 |  |
| (ft/s) | Pro 167 Driver Set-up | 167.0 | 168.9 |  |
|  | Big Pro 175 Driver Set-up | 175.2 | 176.5 |  |
| CoR | Mass Plate (125 ft/s) | 0.812 | 0.796 | +0.016 |
|  | Mass Plate (160 ft/s) | 0.764 | 0.759 | +0.005 |
|  | 200-g Solid Plate (160 ft/s) | 0.759 | 0.753 | +0.006 |
|  | 199.8-g Calibration Plate (160 ft/s) | 0.818 | 0.836 | −0.018 |

As used in the ball speed test, the "average driver set-up" refers to a set of launch conditions, i.e., at a club head speed to which a mechanical golf club has been adjusted so as to generate a ball speed of about 140 ft/s. Similarly, the "standard driver set-up" refers to similar ball speed at launch conditions of about 160 ft/s; the "Pro 167 set-up" refers to a ball speed at launch conditions of about 167 ft/s; and the "Big Pro 175 set-up" refers to a ball speed at launch conditions of about 175 ft/s. Also, as used in the CoR test, the mass plate is a 45-kilogram plate (100 lbs) against which the balls strike at the indicated speed. The 200-gram solid plate is a smaller mass that the balls strike and resembles the mass of a club head. The 199.8-gram calibration plate resembles a driver with a flexible face that has a CoR of 0.830. The ball speed test results show that while Sample-48 holds a ball speed advantage at club speeds of 140 ft/s to 160 ft/s, Sample-80 decidedly has better ball speed at 167 ft/s and 175 ft/s.

Similarly, the CoR test results show that at the higher collision speed (160 ft/s), the CoR generally goes down for both balls, but the 199.8-gram calibration test shows that the CoR of the higher compression Sample-80 is significantly better than the lower compression Sample-48 at the collision speed (160 ft/s). Additionally, while the CoR generally goes down for both balls, the rate of decrease is much less for Sample-80 than for Sample-48. Unless specifically noted, CoR values used hereafter are measured by either the mass plate method or the 200-gram solid plate method, i.e., where the impact plate is not flexible. Unless otherwise noted, CoR values used hereafter are measured by either the mass plate method or the 200-gram solid plate method. Without being limited to any particular theory, it is believed that at high impact speeds, the ball with lower core compression deforms more than the ball with higher core compression. Such deformation negatively affects the initial velocity and CoR of the ball.

In one example, a golf ball is provided with a low compression and high CoR layer, which is supported or otherwise reinforced by a low deformation layer. The low compression, high CoR layer can be made from a polymer composition including a halogenated organosulfur compound. Such rubber and halogenated organosulfur composition is fully disclosed in commonly owned U.S. Pat. No. 6,635,716, the disclosure of which is hereby incorporated by reference in its entirety.

In another example, compositions suitable for golf ball cover layers, particularly durable, cut and scuff resistant, outermost cover layers and inner cover layers, can comprise a thermoset material formed from a composition comprising a crosslinkable polymer, a cis-to-trans catalyst or organosulfur compound, and a co-crosslinking agent. Other additives include, but are not limited to, crosslinking initiators, fillers, antioxidants, light stabilizers, UV absorbers, moisture scavengers, photoinitiators, and silane crosslinkers. The same compositions may be used in any one or more golf ball portions present in any particular construction, such as the inner center, inner core layer, intermediate core layer, outer core layer, intermediate layer, inner cover layer, intermediate cover layer, outer cover layer, and the like and equivalents thereof.

The crosslinkable polymer can be polyolefins, polyamides, polyesters, fluoropolymers, silicones, ionomers, and mixtures thereof. Typically natural or synthetic base rubber can be used, which includes polydienes, polyethylenes (PE), ethylene-propylene copolymers (EP), ethylene-butylene copolymers, polyisoprenes, polybutadienes (PBR), polystyrenebutadienes, polyethylenebutadienes, styrene-propylene-diene rubbers, ethylene-propylene-diene terpolymers (EPDM), fluorinated polymers thereof (e.g., fluorinated EP and fluorinated EPDM), and blends of one or more thereof. Base rubbers can be PBR and EPDM. Suitable PBR may have high 1,4-cis content (e.g., at least 60%, such as greater than about 80%, or at least about 90%, or at least about 95%), low 1,4-cis content (e.g., less than about 50%), high 1,4-trans content (e.g., at least about 40%, such as greater than about 70%, or about 75% or 80%, or greater than about 90%, or about 95%), low 1,4-trans content (e.g., less than about 40%), high 1,2-vinyl content (e.g., at least about 40%, such as about 50% or 60%, or greater than about 70%), or low 1,2-vinyl content (e.g., less than about 30%, such as about 5%, 10%, 12%, 15%, or 20%). PBR can have various combinations of cis-, trans-, and vinyl structures, such as having a trans-structure content greater than cis-structure content and/or 1,2-vinyl structure content, having a cis-structure content greater than trans-structure content and/or 1,2-vinyl structure content, or having a 1,2-vinyl structure content greater than cis-structure content or trans-structure content. Obviously, the various polybutadienes may be utilized alone or in blends of two or more thereof to formulate different compositions in forming golf ball components (cores, covers, and portions or layers within or in between) of any desirable physical and chemical properties and performance characteristics.

Other parameters used in determining suitable base rubber materials include Mooney viscosity, solution viscosity, weight or number average molecular weights, and polydispersity, among others. The base rubber may comprise rubbers of high Mooney viscosity. The base rubber can have a Mooney viscosity greater than about 35, such as greater than about 50, or mid Mooney viscosity range of about 40 to about 60, or high Mooney viscosities of greater than about 65. The polybutadiene rubber can have a weight average molecular weight greater than about 400,000 and a polydispersity of no greater than about 2. A common indicator of the degree of molecular weight distribution of a polymer is its polydispersity, defined as the ratio of weight average molecular weight, $M_w$, to number average molecular weight, $M_n$. Polydispersity ("dispersity") also provides an indication of the extent to which the polymer chains share the same degree of polymerization. If the polydispersity is 1.0, then all polymer chains must have the same degree of polymerization. Since $M_w$ is always equal to or greater than $M_n$, polydispersity, by definition, is equal to or greater than 1.0. Such rubber compounds are commercially available from Bayer of Akron, Ohio, UBE Industries of Tokyo, Japan, and Shell of Houston, Tex., among others.

The base rubber may also be mixed with other elastomers, particularly diene and saturated rubbers, known in the art, such as natural rubbers, polyisoprene rubbers, styrene-butadiene rubbers, diene rubbers, saturated rubbers, polyurethane rubbers, polyurea rubbers, metallocene-catalyzed polymers, plastomers, and multi-olefin polymers (homopolymers, copolymers, and terpolymers) in order to modify the properties of the core. With a major portion (such as greater than 50% by weight, or greater than about 80%) of the base rubber being a polybutadiene or a blend of two, three, four or more polybutadienes, these other miscible elastomers can be present in amounts of less than 50% by weight of the total base rubber, such as in minor quantities of less than about 30%, less than about 15%, or less than about 5%. In one example, the polymeric composition comprises less than about 20% balata, such as 18% or less, or 10% or less, and can be substantially free of balata (i.e., less than about 2%).

Suitable co-crosslinking agents all have di- or polyunsaturation and at least one readily extractable hydrogen in the $\alpha$ position to the unsaturated bonds. Useful co-crosslinking agents include, but are not limited to, mono- or polyfunctional unsaturated carboxylate metallic compounds, polyesters of unsaturated carboxylic acids, polyamides of unsaturated carboxylic acids, esteramides of unsaturated carboxylic acids, bismaleimides, allyl esters of cyanurates, allyl esters of isocyanurates, allyl esters of aromatic acids, mono- and polyunsaturated polycarboxylic acids, anhydrides of mono- and polyunsaturated polycarboxylic acids, monoesters and polyesters of mono- and polyunsaturated polycarboxylic acids, monoamides and polyamides of mono- and polyunsaturated polycarboxylic acids, esteramides and polyesteramides of mono- and polyunsaturated polycarboxylic acids, liquid vinyl polydienes, and mixtures thereof. Unsaturated carboxylate metallic compounds are Type I co-crosslinking agents. They differ from all others, which are Type II co-crosslinking agent, in their effect on the curing characteristics of the system. Type I co-crosslinking agents generally form relatively more reactive free radicals which increase both cure rate and the state of cure of the system, and form ionic crosslinks primarily. Type II co-crosslinking agents form relatively less reactive and more stable free radicals and increase primarily the state of cure of the elastomer, and primarily form carbon-carbon crosslinks. The co-crosslinking agent can be present in the amount of at least about 0.1 parts per one-hundred parts by weight of the base rubber (phr), such as about 0.5 phr, 1 phr, 2 phr, 6 phr, 8 phr, 10 phr, 15 phr, 20 phr, 25 phr, 30 phr, or 40 phr, and up to about 80 phr, such as up to about 60 phr. The amount of carbon-carbon-crosslinks in the resulting thermoset material can be no less than the amount of ionic crosslinks.

Unsaturated carboxylate metallic compounds can have one or more $\alpha,\beta$-unsaturated carboxylate functionalities such as acrylates and methacrylates. The compounds can have one or more metal ions associated with one or more of the unsaturated carboxylate functionalities, such as Zn, Ca, Co, Fe, Mg, Ti, Ni, Cu, etc. Metallic compounds of difunctional unsaturated carboxylates include, without limitation, zinc diacrylate (ZDA), zinc dimethacrylate (ZDMA), calcium diacrylate, and a blend thereof. Metallic compounds of polyfunctional unsaturated carboxylates include reaction products of a) mono-basic unsaturated carboxylic acids such as acrylic acid and/or methacrylic acid, b) di-basic and/or polybasic carboxylic acids having mono- or polyunsaturation, and/or anhydrides thereof, such as those disclosed herein below, and c) divalent metal oxide. Examples of such metallic compounds and their synthesis are disclosed in U.S. Pat. No. 6,566,483, the entirety of which is incorporated herein by reference.

Unsaturated carboxylic acids can be condensed with polyamines (forming polyamides), polyols (forming polyesters), or aminoalcohols (forming esteramides). Non-limiting examples of unsaturated carboxylic acid condensates include tripropylene glycol diacrylate, Bisphenol A diglycidylether diacrylate, 1,6-Hexanediol diacrylate, 1,4-butanediol dimethacrylate, ethyleneglycol dimethacrylate, polyethylene glycol dimethacrylate, diethylene glycol dimethacrylate, urethane dimethacrylate, tetraethylene glycol dimethacrylate, triethylene glycol dimethacrylate, trimethylolpropane trimethacrylate, pentaerythritol triacrylate, and trimethylolpropane triacrylate.

Non-limiting example of bismaleimide include N,N'-m-phenylenedimaleimide (HVA-2, available from Dupont). Non-limiting examples of allyl esters include triallyl cyanurate (Akrosorb® 19203, available from Akrochem Corp. of Akron, Ohio), triallyl isocyanurate (Akrosorb® 19251, also available from Akrochem Corp.), and triallyl trimaletate (TATM, available from Sartomer Company of Exton, Pa.). Non-limiting examples of mono- or polyunsaturated polycarboxylic acids and derivatives thereof include citraconic acid, itaconic acid, fumaric acid, maleic acid, mesaconic acid, acohitic acid, maleic anhydride, itaconic anhydride, citraconic anhydride, poly(meth)acrylic acid, polyitaconic acid, copolymers of (meth)acrylic acid and maleic acid, copolymers of (meth)acrylic acid and styrene, and fatty acids having a $C_6$ or longer chain, such as hexadecenedioic acid, octadecenedioic acid, vinyl-tetradecenedioic acid, eicosedienedioic acid, dimethyl-eicosedienedioic acid, 8-vinyl-10-octadecenedioic acid, anhydrides thereof, methyl, ethyl, and other linear or branched alkyl esters thereof, amides thereof, esteramides thereof, and mixtures thereof.

Liquid vinyl polydienes are liquid at ambient temperature, such as liquid vinyl polybutadiene homopolymers and copolymers, and can have low to moderate viscosity, low volatility and emission, high boiling point (such as greater than 300° C.), and molecular weight of about 1,000 to about 5,000, such as about 1,800 to about 4,000, or about 2,000 to about 3,500. Non-limiting examples of liquid vinyl polydienes include 90% high vinyl polybutadiene having a molecular weight of about 3,200, 0 (70% high vinyl 1,2-polybutadiene having a molecular weight of about 2,400, and 70% high vinyl poly(butadiene-styrene) copolymer having a molecular weight of about 2,400.

The cis-to-trans catalyst or organosulfur compound, such as halogenated compound, can be one having cis-to-trans catalytic activity or a sulfur atom (or both), and can be present in the polymeric composition by at least about 2.2 phr, such as less than about 2.2–5 phr. Useful compounds of this category include those disclosed in U.S. Pat. Nos. 6,525,141, 6,465,578, 6,184,301, 6,139,447, 5,697,856, 5,816,944, and 5,252,652, the disclosures of which are incorporated by reference in their entirety.

The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; the metal salts thereof, and mixtures thereof. The metal salt may be zinc, calcium, potassium, magnesium, sodium, and lithium. Pentachlorothiophenol is commercially available from Strucktol Company of Stow, Ohio, and zinc pentachlorothiophenol is commercially available from eChinachem of San Francisco, Calif.

Suitable crosslinking initiators include any known polymerization initiators known or available to one skilled in the art that are capable of generating reactive free radicals. Such initiators include, but are not limited to, sulfur and organic peroxide compounds. Peroxide initiators can be dialkyl peroxides which include, without limitation, di-t-amyl peroxide, di-t-butyl peroxide, t-butyl cumyl peroxide, di-cumyl peroxide (DCP), di(2-methyl-1-phenyl-2-propyl)peroxide, t-butyl 2-methyl-1-phenyl-2-propyl peroxide, di(t-butylperoxy)-diisopropylbenzene, 2,5-dimethyl-2,5-di(t-butylperoxy)hexane, 2,5-dimethyl-2,5-di(t-butylperoxy)hexyne-3,1, 1-di(t-butylperoxy)-3,3,5-trimethylcyclohexane, 4,4-di(t-butylperoxy)-n-butylvalerate, and mixtures thereof. DCP is the most commonly used peroxide in golf ball manufacturing. Di(t-butylperoxy)-diisopropylbenzene can provide higher crosslinking efficiency, low odor and longer scorch time, among other properties. DCP can be blended with di(t-butylperoxy)-diisopropylbenzene. In the pure form, the peroxide or blend of peroxides can be used at an amount of about 0.25 phr to about 2.5 phr.

Any filler known or available to one skilled in the art can be used in any desired quantity to alter a property of the various golf ball portions, including specific gravity, color/appearance, flexural modulus, moment of inertia, and rheological properties, among others. Suitable fillers include, but are not limited to, tungsten, zinc oxide, barium sulfate, silica, metal oxides, and ceramic materials. The fillers may be used in the forms of particulates, fibers, flakes, whiskers, filaments, etc. Dual-functional fillers are often used. For example, zinc oxide is also known for its cross-link activities, and is often used as a dual filler/initiator material, while titanium oxide is used as a dual filler/brightener material.

Other additives may be chosen from those known or available to one skilled in the art, and used in appropriate quantities to achieve the desirable effects. For example, antioxidants include di(t-butyl)hydroquinone and others as disclosed in U.S. Pat. No. 4,974,852, which is incorporated herein by reference entirely. Moisture scavengers can be low-viscosity, reactive, non-reactive, include isocyanate-containing compounds such as monomeric compounds like p-tolune sulfonyl isocyanate (PTSI from VanDeMark Inc. of Lockport, N.Y.) and polymeric compounds like polymeric methylene diphenyl diisocyanate (PAPI® MDI from Dow Chemical), oxazolidines, oxazolanes, orthoformates such as trimethyl- and triethyl orthoformates, orthoacetates such as trimethyl- and triethyl orthoacetates, alkyl (linear or branched $C_1$ to $C_{12}$ alkyls) esters of toluene sulfonic acid such as methyl p-toluene sulfonate (MTS), and vinyl silanes. These moisture scavengers can be used alone or in combination thereof, or in combinations with other moisture scavengers such as calcium oxide and molecular sieves. Amount of the moisture scavengers can be about 10 phr or less, such as about 5 phr or less, and can be about 0.01 phr or greater, such as about 0.05 phr or greater, or about 0.1 phr or greater. Various light stabilizers, UV absorbers, photoinitiators, and silane crosslinkers are all readily available.

The polybutadiene-based compositions described above may be used in any portion of golf balls of any constructions. In one example, the polybutadiene-based composition can be used to form a durable, cut resistant, scuff resistant, highly cross-linked outer cover layer of a golf ball. Such an outer cover layer may constitute the entire cover of the golf ball by itself (i.e., a single layer cover) or form a multi-layer cover with one or more inner cover layer(s) and/or intermediate cover layer(s). This outer cover layer can have a thickness of about 0.001 inches to about 0.125 inches, such as about 0.005 inches to about 0.1 inches, or about 0.01 inches to about 0.05 inches, or about 0.015 inches to about 0.04 inches, like about 0.035 inches. This outer cover layer may have a low flexural modulus of less than about 50,000 psi, such as about 1,000 psi to about 30,000 psi, or about 2,000 psi to about 25,000 psi. The Shore D hardness of this outer cover layer can be about 20 to about 60, such as about 25 to about 55.

The low deformation layer in accordance to the present disclosure may comprise a durable, low deformation material such as metal, rigid plastics or rubbers or thermosetting materials, or polymers re-enforced with high strength organic or inorganic fillers or fibers, or blends or composites thereof, as discussed below. Suitable plastics or polymers include, but not limited to, high cis- or trans-polybutadiene, one or more of partially or fully neutralized ionomers including those neutralized by a metal ion source wherein the metal ion can be the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, EPR, EPDM, thermoplastic or thermosetting polyurethanes, polyureas, polyurethane ionomers, epoxies, polycarbonates, polybutadiene, polyisoprene, and blends thereof. In the case of metallocenes, the polymer may be cross-linked with a free radical source, such as peroxide, or by high radiation. Suitable polymeric materials also include those listed in U.S. Pat. Nos. 6,187,864, 6,232,400, 6,245,862, 6,290,611, 6,142,887, 5,902,855 and 5,306,760 and in PCT publication nos. WO 01/29129 and WO 00/23519.

When the low deformation layer is made with polybutadiene or other synthetic and natural rubber, the rubber composition can be highly cross-linked with at least 50 phr of a suitable co-reaction agent, which includes a metal salt of diacrylate, dimethacrylate or mono methacrylate, such as zinc diacrylate. Highly cross-linked rubber compounds are discussed in commonly owned co-pending patent application entitled "Golf Ball and Method for Controlling the Spin Rate of Same" bearing Ser. No. 10/178,580 filed on Jul. 20, 2002. This discussion is incorporated herein by reference.

Another readily apparent advantage of the present disclosure is that highly rigid materials, such as certain metals, can now be used in a golf ball, because the rigidity of the materials can resist the deformation of the low compression, high CoR layer. Suitable rigid metals include, but not limited to, tungsten, steel, titanium, chromium, nickel, copper, aluminum, zinc, magnesium, lead, tin, iron, molybdenum and alloys thereof.

Figure 1:
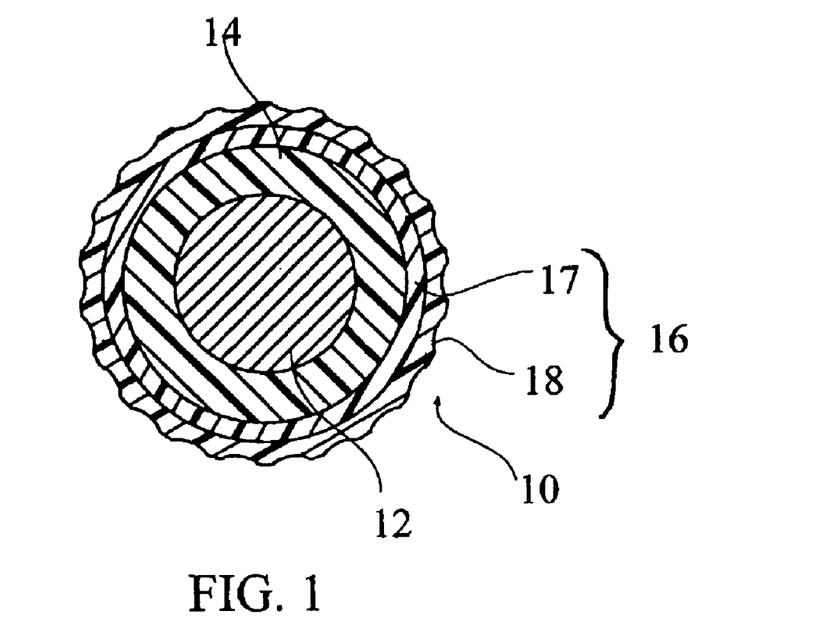
FIG. 1 is a cross-sectional view of a first example of the present disclosure.

Suitable highly rigid materials include those listed in columns 11, 12 and 17 of U.S. Pat. No. 6,244,977. Fillers with very high specific gravity such as those disclosed in U.S. Pat. No. 6,287,217 at columns 31–32 can also be incorporated into the inner core 15. Suitable fillers and composites include, but not limited to, carbon including graphite, glass, aramid, polyester, polyethylene, polypropylene, silicon carbide, boron carbide, natural or synthetic silk.

The outermost cover layer of the present disclosure may be formed by various methods known to one skilled in the art. For example, the composition of the outermost cover layer can be mixed in an internal mixer (banbury, krupp, etc.) extruder, a two-roll mill, or a calendar, and molded over a golf ball subassembly through crosslinking of the composition using conventional compression molding (under heat and pressure) or by alternative crosslinking means, e.g., ultrasonic waves, or electromagnetic radiation such as X-radiation, γ-radiation, electron beam, ultraviolet radiation, visual radiation, and infrared radiation. Substantially thermoplastic half-shells may be preformed from the composition and then molded onto the golf ball subassembly through compression molding or the FIG. 8 method of U.S. Pat. No. 6,056,842, which is entirely incorporated herein by reference. Alternatively, the composition may be injection molded with relatively cold screw into a hot mold using known rubber injection molding techniques.

Any two adjoining layers of compatible or incompatible materials in the golf ball can have good adhesion therebetween, such as between the outermost cover layer and an inner cover layer. The adhesion can be in the form of direct chemical bonding, such as carbon-carbon crosslinks, ionic crosslinks, or via silane-type crosslinkers, or a combination thereof. For example, the inner cover layer may be formed from a fluoropolymer, such as those disclose in U.S. Pat. No. 6,652,943, which is entirely incorporated by reference herein, while the outermost cover layer may be formed from a diene rubber such as EPDM. To impart direct chemical bonding between these two layers, the fluoropolymer composition can be first molded into the inner cover layer over a golf ball subassembly such as a unitary core or a dual-layer core through injection molding or compression. molding. The inner cover layer may be crosslinked at this point, or uncrosslinked, and may be co-crosslinked simultaneous with the outermost cover layer. The diene rubber composition for the outermost cover layer can then be applied onto the inner cover layer likewise through injection molding or compression molding, followed by crosslinking. During this crosslinking stage, crosslinks are formed simultaneously within the outermost cover layer (i.e., internal crosslinks)

and between the outermost cover layer and the inner cover layer (more precisely, interfacial crosslinks are formed between the two incompatible materials of the two adjoining cover layers). This method can result in strong adhesion between the cover layers without the need for adhesives, additional tie layers, or surface treatments.

In accordance to one example of the present disclosure, golf ball 10 comprises at least two core layers, an innermost core 12 and an outer core 14, and a cover 16. Outer core 14 can comprise a flexible, low compression, high CoR rubber composition discussed above, and inner core 12 comprises a low deformation material discussed above. The hard, low deformation inner core 12 resists deformation at high club speeds to maintain the CoR at an optimal level, while the resilient outer layer 14 provides high CoR at slower club speeds and the requisite softness for high iron club play. The inventive ball 10, therefore, enjoys high initial velocity and high CoR at high and low club head speeds associated, while maintaining a desirable soft feel and soft sound for greenside play.

In accordance to one aspect of the present disclosure, inner core 12 can be made from a rubber composition that is highly cross-linked with more than 50 phr of zinc diacrylate and the outer core 14 comprises rubber composition containing at least 2.2 phr of a halogenated organosulfur compound.

In accordance to one aspect of this first example, inner core 12 comprises a thin, hollow metal shell encased by an outer shell comprising rubber composition containing at least 2.2 phr of a halogenated organosulfur compound.

Other rubber compounds for outer core 14 may also include any low compression, high resilient polymers comprising natural rubbers, including cis-polyisoprene, trans-polyisoprene or balata, synthetic rubbers including 1,2-polybutadiene, cis-polybutadiene, trans-polybutadiene, polychloroprene, poly(norbornene), polyoctenamer and polypentenamer among other diene polymers. Outer core 14 may comprise a plurality of layers, e.g., a laminate, where several thin flexible layers are plied or otherwise adhered together.

The rigid inner core 12 can have a flexural modulus in the range of about 25,000 psi to about 250,000 psi, such as about 75,000 psi to about 225,000 psi, or about 80,000 psi to about 200,000 psi. Furthermore, the rigid inner core can have durometer hardness in the range of greater than about 70 on the Shore C scale. The compression of the rigid inner core can be greater than about 60 PGA or Atti, such as greater than about 70, or greater than about 80. Shore hardness is measured according to ASTM D-2240-00, and flexural modulus is measured in accordance to ASTM D6272-98 about two weeks after the test specimen are prepared.

The outer core can be softer and have a lower compression than the inner core. Outer core 14 can have a flexural modulus of about 500 psi to about 25,000 psi, or less than about 15,000 psi. The outer core can have a hardness of about 25 to about 70 on the Shore C scale, or less than 60.

One way to achieve the difference in hardness between the inner core and the outer core is to make the inner core from un-foamed polymer, and to make the outer core from foamed polymer selected from the suitable materials disclosed herein. Alternatively, the outer core may be made from these suitable materials having their specific gravity reduced. In this example the inner and outer core can be made from the same polymer or polymeric composition.

Outer core layer 14 can have a thickness from about 0.001 inch to about 0.1 inch, such as from about 0.01 inch to about 0.05 inch, or about 0.015 inch to about 0.035 inch. The overall core diameter can be greater than about 1.5 inch, such as greater than about 1.58 inch, or greater than about 1.6 inch. The inner core 12 may have any dimension so long as the overall core diameter has the dimensions listed above.

The cover 16 should be tough, cut-resistant, and selected from conventional materials used as golf ball covers based on the desired performance characteristics. The cover may be comprised of one or more layers. Cover materials such as ionomer resins, blends of ionomer resins, thermoplastic or thermoset urethane, and balata, can be used as known in the art.

The cover 16 can be a resilient, non-reduced specific gravity layer. Suitable materials include any material that allows for tailoring of ball compression, coefficient of restitution, spin rate, etc. and are disclosed in U.S. Pat. Nos. 6,152,834, 5,919,100 and 5,885,172, such as ionomers, ionomer blends, thermosetting or thermoplastic polyurethanes, and metallocenes. The cover can be manufactured by a casting method, reaction injection molded, injected or compression molded, sprayed or dipped method.

In one example, cover 16 comprises an inner cover 17 and an outer cover 18. As disclosed in the U.S. Pat. Nos. 5,885,172 and 6,132,324, which are incorporated herein by reference in their entireties, outer cover layer 18 can be made from a soft thermoset material, such as cast polyurethane, and inner cover 17 can be made from a rigid material to provide ball 10 with progressive performance, i.e., the ball has the low spin and long distance benefits of a hard cover ball when struck with a driver club and high spin and soft feel characteristics of a traditional soft cover ball when struck with short irons.

Inner cover layer 17 can be formed from a hard, high flexural modulus, resilient material which contribute to the low spin, distance characteristics when they are struck for long shots (e.g. driver or long irons). Specifically, the inner cover layer materials have a Shore D hardness of about 65–80, such as about 69–74 or about 70–72. The flexural modulus of inner cover layer 17 can be at least about 65,000 psi, such as about 70,000 psi to about 120,000 psi or at least about 75,000 psi. The thickness of the inner cover layer can range from about 0.020 inches to about 0.045 inches, such as about 0.030 inches to about 0.040 inches or about 0.035 inches.

Outer cover layer 18 can be formed from a relatively soft thermoset material in order to replicate the soft feel and high spin play characteristics of a balata ball for "short game" shots. The outer cover layer can have Shore D hardness of less than 65 or from about 30 to about 60, such as 35–50 or 40–45. Additionally, the materials of the outer cover layer can have a degree of abrasion resistance in order to be suitable for use as a golf ball cover. The outer cover layer of the present disclosure can comprise any suitable thermoset material, which can be formed from a castable reactive liquid material. The materials for the outer cover layer include, but are not limited to, thermoset urethanes and polyurethanes, thermoset urethane ionomers, thermoset urethane epoxies, and polyureas. Examples of suitable polyurethane ionomers are disclosed in U.S. Pat. No. 5,692,974 entitled "Golf Ball Covers," the disclosure of which is hereby incorporated by reference.

Golf ball 10 in accordance to the first example achieves the objects of this disclosure, because the rigid inner core 12 provides the ball with low deformation at high club head speeds to maintain the CoR in the high range at high club head speeds, while the low compression, high CoR outer core 14 provides high CoR and good feel at lower club head speeds.

Figure 2:
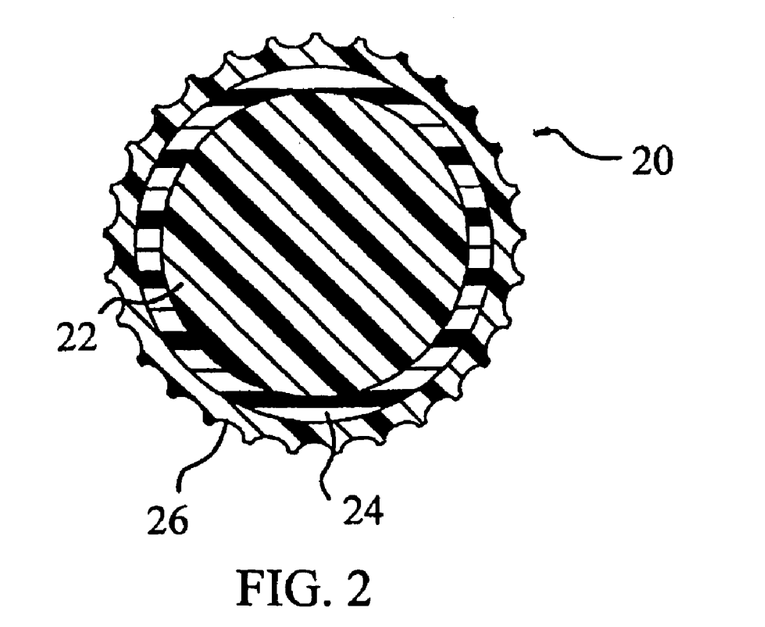
FIG. 2 is a cross-sectional view of a second example of the present disclosure.

In accordance to a second example of the present disclosure, golf ball 20 comprises a low compression, high CoR inner core 22, a relatively robust, low deformation mantle or intermediate layer 24 and a thin soft cover 26. Ball 20 also has low deformation during impacts at high club speeds, such as hollow wood drivers, and still has soft "feel" and sound at lower club speeds. To achieve this object, the diameter of the inner core 22 can be 1.5 inches or smaller, but occupy sufficient volume to positively impact the feel, sound and overall compression. The mantle or intermediate layer can have a thickness of at least about 0.08 inch, such as at least about 0.09 inch or about 0.09–0.18 inch. The desired thickness can be selected in conjunction with the flexural modulus of the material of the mantle and the desired overall compression of the ball and deformation of the ball. Thicker mantle would provide lower deformation and higher compression.

Inner core 22 can be formed from a rubber composition containing a halogenated organosulfur compound. Such halogenated organosulfur compound is fully disclosed in commonly owned and co-pending '963 and '448 patent applications, which have already incorporated by reference and discussed above. In accordance to one aspect of the second example, the rubber compound can be a high cis- or trans-polybutadiene and have a viscosity of about 40 Mooney to about 60 Mooney. The core can have a hardness of greater than about 70 on the Shore C scale, such as greater than 80. The core also can have a compression of less than about 60 PGA, such as less than about 50 PGA. The resulting core can exhibit a CoR of at least about 0.79, such as at least 0.8 at 125 ft/s. Other suitable polymers for inner core 22 include a polyethylene copolymer, EPR, EPDM, a metallocene catalyzed polymer or any of the materials discussed above in connection with outer core 14 discussed above, so long as the compression, hardness and CoR are met.

Inner core 22 may be encased by outer core layers comprising the same materials or different compositions than inner core 22. These outer core layers may be laminated together. Each of the laminate layers can have a thickness of about 0.001 inch to about 0.1 inch, such as about 0.01 inch to about 0.05 inch.

Mantle 24 can be made from a low deformation polymeric material, such as an ionomer, including low and high acid ionomer, any partially or fully neutralized ionomer or any thermoplastic or thermosetting polymer. Mantle 24 can have a flexural modulus of greater than 55,000 psi, such as greater than 60,000 psi. Hard, high flexural modulus ionomer resins and blends thereof can be used. Additionally, other suitable mantle materials (as well as core and cover materials) are disclosed in U.S. Pat. No. 5,919,100 and international publications WO 00/23519 and WO 01/29129. These disclosures are incorporated by reference herein. One particularly suitable material disclosed in WO 01/29129 is a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized.

These ionomers can be obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). Such acid-containing ethylene copolymer ionomer component includes E/X/Y copolymers where E is ethylene, X is a softening comonomer such as acrylate or methacrylate present in 0–50 (such as 0–25 or 0–20) weight percent of the polymer, and Y is acrylic or methacrylic acid present in 5–35 (such as at least about 16, or at least about 16–35, or at least about 16–20) weight percent of the polymer, wherein the acid moiety is neutralized 1–90% (such as at least 40% or at least about 60%) to form an ionomer by a cation such as lithium, sodium, potassium, magnesium, calcium, barium, lead, tin, zinc, aluminum, or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

The manner in which the ionomers are made is known. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li), which have a methacrylic acid content of about 19%.

Other suitable mantle materials include the low deformation materials described above and any hard, high flexural modulus, resilient material that is compatible with the other materials of the golf ball. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrenebutadiene elastomer, a metallocene polymer or blends thereof.

Suitable thermoplastic polyetheresters include materials, which are commercially available from DuPont under the tradename Hytrel®. Suitable thermoplastic polyetheramides include materials, which are available from Elf-Atochem under the tradename Pebax®. Other suitable materials for the inner cover layer include nylon and acrylonitrile-butadiene-styrene copolymer (ABS).

Another suitable material for the mantle layer can be a high stiffness, highly neutralized ionomer having a durometer hardness of at least about 55 on the Shore D scale and a flexural modulus of at least 50,000 psi. The flexural modulus ranges from about 50,000 psi to about 150,000 psi. The hardness ranges from about 55 to about 80 Shore D. This ionomer may be blended with a lowly neutralized ionomers having an acid content of 5 to 25%, and may be blended with non-ionomeric polymers or compatilizers (e.g., glycidyl or maleic anhydride), so long as the hardness and flexural modulus are satisfied. Examples of highly neutralized ionomers are disclosed in commonly owned, co-pending patent application entitled "Golf Ball Comprising Highly-Neutralized Acid Polymers" bearing Ser. No. 10/118,719 filed on Apr. 9, 2002. This application is incorporated herein by reference.

In one example, this suitable material can be a blend of a fatty acid salt highly neutralized polymer, such as a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized, and a high stiffness partially neutralized ionomer, such as those commercially available as Surlyn® 8945, 7940, 8140 and 9120, among others. This blend can have hardness in the range of about 65 to about 75 on the Shore D scale.

Acid copolymer compositions and ionomer compositions useful in core centers, core layers, intermediate layers, and cover layers of the present disclosure are described in U.S. application Ser. No. 09/691,284, now U.S. Pat. No. 6,653,382, U.S. application Ser. No. 10/108,793, now U.S. Publication No. 20030050373, U.S. application Ser. No. 10/230,015, now U.S. Publication No. 20030114565, and U.S. application Ser. No. 10/269,341, now U.S. Publication No. 20030130434, the disclosures of which are incorporated herein by reference in their entirety. The acid copolymers are E/X or E/X/Y copolymers where E is ethylene, X is $\alpha,\beta$-ethylenically unsaturated carboxylic acid or a combination of two or more thereof, such as having about 3–8 carbon atoms (e.g., acrylic acid and/or methacrylic acid), and Y is a softening co-monomer, such as alkyl (meth)acrylate where the alkyl group can be linear or branched and have about 1–8 carbon atoms (e.g., n-butyl). By "softening," it is meant that the crystallinity is disrupted (the polymer is made less crystalline). X can be at least about 2 wt. % of the copolymer, such as 2–30, 3–30, 4–20, 4–25, 5–20, or 5–20 wt. % of the polymer, and Y can be present in 0–30, 3–25, 10–23, 17–40, 20–40, or 24–35 wt. % of the acid copolymer.

Soft, resilient ionomers included in this disclosure can be partially neutralized ethylene/(meth) acrylic acid /butyl (meth) acrylate copolymers having a melt index (MI) and level of neutralization that results in a melt-processible polymer that has useful physical properties. The copolymers are at least partially neutralized. At least 40%, or at least 55%, such as about 70% or about 80% of the acid moiety of the acid copolymer can be neutralized by one or more alkali metal, transition metal, or alkaline earth metal cations, such as lithium, sodium, potassium, magnesium, calcium, barium, or zinc, or a combination of such cations.

Soft, resilient, thermoplastic, "modified" ionomers are also exemplary materials for use in any one or more golf ball portions present in any particular construction, such as the innermost center, inner core layer, intermediate core layer, outer core layer, intermediate layer, inner cover layer, intermediate cover layer, outermost cover layer, and the like and equivalents thereof. The "modified" ionomer can comprise a melt blend of (a) the acid copolymers or the melt processible ionomers made therefrom as described above and (b) one or more organic acid(s) or salt(s) thereof, wherein greater than 80%, or greater than 90%, even 100% of all the acid of (a) and of (b) can be neutralized by one or more cations. Amount of cations in excess of the amount required to neutralize 100% of the acid in (a) and (b) can be used to neutralize the acid in (a) and (b). Blends with fatty acids or fatty acid salts can be used.

The organic acids or salts thereof can be added in an amount sufficient to enhance the resilience of the copolymer, and/or substantially eliminate crystallinity of the copolymer. The amount can be at least about 5% by weight of the total amount of copolymer and organic acid(s), such as at least about 15%, or at least about 20%, and up to about 50%, such as up to about 40% or up to about 35%. Alternatively, the amount of the organic acids or salts thereof can be about 25–150 phr by weight of the copolymer or blend of copolymers. The non-volatile, non-migratory organic acids can be aliphatic, mono-functional, saturated or unsaturated organic acids or salts thereof as described below, such as those having less than about 36 carbon atoms, like fatty acids (e.g., stearic acid and oleic acid) or salts thereof. Agents other than organic acids/salts may be used, as long as they also exhibit ionic array plasticizing and ethylene crystallinity suppression properties.

Processes for fatty acid/salt modifications are known in the art. The modified highly-neutralized soft, resilient acid copolymer ionomers can be produced by:

(a) melt-blending (1) ethylene, $\alpha,\beta$-ethylenically unsaturated $C_3$ to $C_8$ carboxylic acid copolymer(s) or melt-processible ionomer(s) thereof, optionally having crystallinity disrupted by addition of a softening monomer or other means, with (2) sufficient amount of non-volatile, non-migratory organic acids to substantially enhance the resilience and to disrupt or remove the remaining ethylene crystallinity, and then, concurrently or subsequently, (b) Adding a sufficient amount of a cation source to increase the level of neutralization of all the acid moieties (including those in the acid copolymer and in the organic acid if the non-volatile, non-migratory organic acid is an organic acid) to the desired level.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared. The weight ratio of X to Y in the composition can be at least about 1:20, such as at least about 1:15, or at least about 1:10, and up to about 2:1, such as up to about 1.2:1, up to about 1:1.67, up to about 1:2, or up to about 1:2.2.

The acid copolymers can be "direct" acid copolymers (containing high levels of softening monomers). As noted above, the copolymers can be partially, highly, or fully neutralized, such as at least about 40%, 45%, 50%, 55%, 70, 80%, 90%, or 100% neutralized. The MI of the acid copolymer should be sufficiently high so that the resulting neutralized resin has a measurable MI in accord with ASTM D-1238, condition E, at 190° C., using a 2160 gram weight, such as at least about 0.1 g/10 min, at least about 0.5 g/10 min, or about 1 g/10 min or greater. In highly neutralized acid copolymer, the MI of the acid copolymer base resin can be at least about 20 g/10 min, at least 40 g/10 min, at least 75 g/10 min, at least 100 g/10 min, or at least 150 g/10 min.

Specific acid-copolymers include ethylene/(meth)acrylic acid/n-butyl(meth)acrylate, ethylene/(meth)acrylic acid/isobutyl(meth)acrylate, ethylene/(meth)acrylic acid/methyl (meth)acrylate, and ethylene/(meth)acrylic acid/ethyl(meth) acrylate terpolymers. The organic acids and salts thereof employed can be aliphatic, mono-functional (saturated, mono-unsaturated, or poly-unsaturated) organic acids, particularly those having fewer than 36 carbon atoms, such as 6–26, 6–18, or 6–12 carbon atoms. The salts may be any of a wide variety, including the barium, lithium, sodium, zinc, bismuth, potassium, strontium, magnesium and calcium salts of the organic acids. Non-limiting examples of the organic acids include caproic acid, caprylic acid, capric acid, lauric acid, stearic acid, behenic acid, erucic acid, oleic acid, and linoleic acid. Optional additives include acid copolymer wax (e.g., Allied wax AC 143 believed to be an ethylene/16–18% acrylic acid copolymer with a number average molecular weight of 2,040), which assist in preventing reaction between the filler materials (e.g., ZnO) and the acid moiety in the ethylene copolymer, $TiO_2$ (a whitening agent), optical brighteners, etc.

Ionomers may be blended with conventional ionomeric copolymers and terpolymers, and non-ionomeric thermoplastic resins. The non-ionomeric thermoplastic resins include, without limit, thermoplastic elastomers such as polyurethane, poly-ether-ester, poly-amide-ether, polyether-urea, PEBAX (a family of block copolymers based on polyether-block-amide, commercially suppled by Atochem), styrene-butadiene-styrene (SBS) block copolymers, styrene (ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth) acrylates, (meth)acrylic acid, epoxy-functionalized monomer, CO, etc., functionalized polymers with maleic anhydride grafting, epoxidization etc., elastomers such as EPDM, metallocene catalyzed PE and copolymer, ground up powders of the thermoset elastomers, etc. Such thermoplastic blends can comprise about 1% to about 99% by weight of a first thermoplastic and about 99% to about 1% by weight of a second thermoplastic.

Exemplary fully neutralized ionomers were molded into 1.53 inch diameter spheres and measured for the compression and CoR, as listed in Table II below.

TABLE II

| Sample | Resin Type (%) | Acid Type (%) | Cation (% neut.*) | M.I. (g./10 min) | Atti Compression | COR @ 125 ft/s |
|---|---|---|---|---|---|---|
| 1A | A (60) | Oleic (40) | Mg (100) | 1.0 | 75 | 0.826 |
| 2B | A (60) | Oleic (40) | Mg (105*) | 0.9 | 75 | 0.826 |
| 3C | B (60) | Oleic (40) | Mg (100) | 0.9 | 78 | 0.837 |
| 4D | B (60) | Oleic (40) | Mg (105*) | 0.9 | 76 | 0.837 |
| 5E | B (60) | Stearic (40) | Mg (100) | 0.85 | 97 | 0.807 |

A - ethylene, 14.8% n-butyl acrylate, 8.3% acrylic acid
B - ethylene, 14.9% n-butyl acrylate, 10.1% acrylic acid
*Cation amount being sufficient to neutralize 105% of all acid in the resin and the organic acid.

Commercially available highly neutralized polymers HNP1000 and HNP2000, the properties of which are listed in Table III below, were molded into 1.53 inch diameter spheres and measured for the compression and CoR, presented in Table IV below.

TABLE III

| Material Properties | HNP1000 | HNP2000 |
|---|---|---|
| Specific Gravity | 0.966 g/cc | 0.974 g/cc |
| Melt Flow @ 190 C. Kg load | 0.65 g/10 min | 1.0 g/10 min |
| Shore D Flex Bar (40 hr) | 47.0 | 46.0 |
| Shore D Flex Bar (2 week) | 51.0 | 48.0 |
| Flex Modulus (40 hr) | 25.8 kpsi | 16.1 kpsi |
| Flex Modulus (2 week) | 39.9 kpsi | 21.0 kpsi |
| DSC Melting Point | 61.0° C. | 61/101° C. |
| Moisture Content | 1500 ppm | 4500 ppm |
| Wt % Mg | 2.65% | 2.96% |

TABLE IV

| | Samples | | | | |
|---|---|---|---|---|---|
| | A | B | C | D | E |
| Ionomer | HNP1000 | HNP1000 | HNP2000 | HNP2000 | HNP1000/HNP2000 (2:1) |
| Filler Type | None | Tungsten | None | Tungsten | Tungsten |
| SG (g/cc) | 0.954 | 1.146 | 0.959 | 1.154 | 1.148 |
| Atti Compression | 107 | 62 | 83 | 86 | 72 |
| Shore C | | 72 | | 79 | 75 |

TABLE IV-continued

| | Samples | | | | |
|---|---|---|---|---|---|
| | A | B | C | D | E |
| Shore D | 51 | 42 | 47 | 49 | 45 |
| CoR | 0.827 | 0.806 | 0.853 | 0.844 | 0.822 |

Mantle 24 may also comprise a laminated layer. For example, mantle 24 may comprise a laminate comprising four layers: a polyamide layer having a flexural modulus of about 200,000 psi, a terpolymer ionomer or un-neutralized acid terpolymer having a flexural modulus of about 30,000 psi, a low acid ionomer having a flexural modulus of about 60,000 psi and a high acid ionomer having a flexural modulus of about 70,000 psi. The composite flexural modulus of the four-layer laminate can be about 90,000 psi or approximately the average of the flexural modulus of the four layers, assuming that the thickness of each layer is about the same.

Cover 26 can be a two-layer cover similar to cover 16 discussed above. Alternatively, cover 26 may be a single-layer cover made from a soft material, such as cast polyurethane, similar to cover 16 discussed above.

In one example, inner core 22 can have a diameter of about 0.8 to about 1.4 inches, a compression of about 30 PGA (or a deformation at 130-10 kg of about 5 mm) and a CoR of about 0.8. Mantle 24 can comprise a high acid ionomer having a flexural modulus of about 70,000 psi or higher and have a thickness of about 0.11 inch. Cover 26 can have an outermost layer comprising cast polyurethane having a hardness of about 45 to 60 on the Shore D scale and a thickness of about 0.02 to about 0.04 inch. This golf ball can exhibit high CoR at low and high club head speeds, while providing a soft feel for iron and putter play. The compression can be a low as 0 PGA, and the flexural modulus of the mantle can be as low as 50,000 psi.

Figure 3:
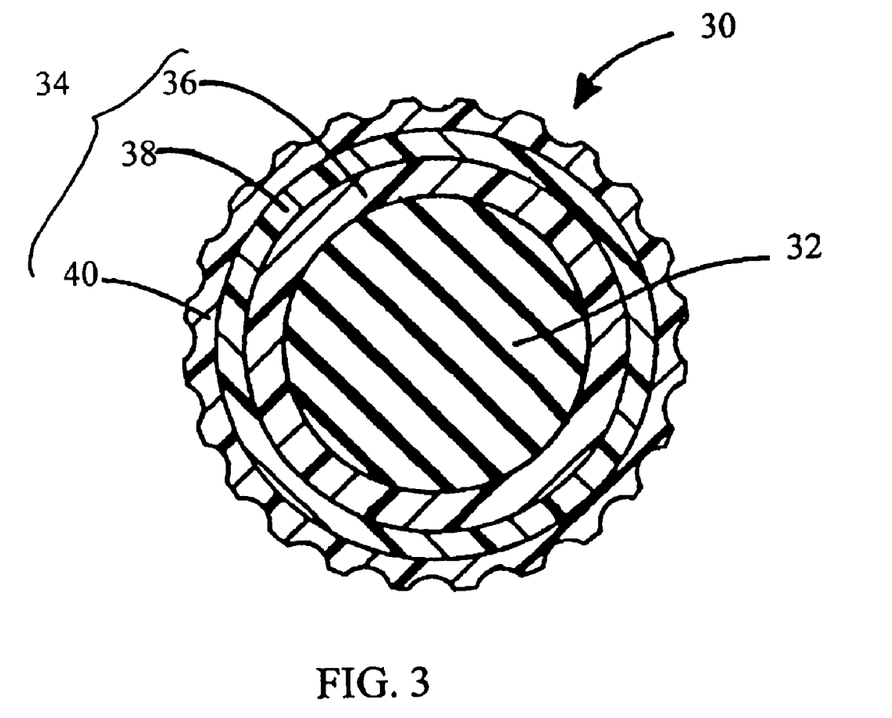
FIG. 3 is a cross-sectional view of a third example of the present disclosure.

In accordance to a third example of the present disclosure, golf ball 30 comprises a high compression, high resilient core 32 and cover 34 comprising at least three cover layers.

Core 32 can comprise a single solid layer. Alternatively, core 32 may comprise multiple layers. Its diameter can be at least about 1.4 inches, such as more than about 1.43 inches or more than about 1.45 inches. Core 32 can be a high compression core having a compression greater than about 80 PGA, such as greater than about 90 PGA or greater than about 100 PGA. Core 32 can have a CoR of at least about 0.79, such as at least about 0.8 or about 0.82–0.9 so as to give ball 30 a CoR of at least 0.8 or about 0.82 to about 0.88. Core 32 may be made from any of the low deformation materials discussed above, so long as it has these properties.

Cover 34 can have inner cover layer 36, intermediate cover layer 38 and outer cover layer 40.

Inner cover layer 36 can be made from a low compression, high CoR material such as rubber compositions comprising at least about 2.2 phr of halogenated organosulfur compound, as disclosed in commonly owned, co-pending '963 patent application or rubber compositions disclosed in commonly owned, co-pending '448 patent application. Inner cover layer 36 can have flexural modulus of about 500 psi to about 25,000 psi, hardness of about 25 to about 80 on the Shore C scale.

In one example, intermediate cover layer 38 and outer cover layer 40 can be similar to the inner cover layer 17 and the outer cover layer 18 of cover 16, respectively, for progressive performance. For example, outer cover layer 40 can be made from a soft, thermosetting polymer, such as cast polyurethane, and intermediate cover layer 38 can be made from a rigid ionomer or similar composition having hardness of at least 55 on the Shore D scale and flexural modulus of at least 55,000 psi.

The total thickness the cover 34 can be less than 0.125 inch. Innermost layer 36 can be about 0.005 inch to about 0.1 inch thick, such as about 0.01 inch to about 0.09 inch or about 0.015 inch to about 0.07 inch. Intermediate cover layer 38 can be about 0.01 inch to about 0.05 inch thick, and outer cover layer 40 can be about 0.02 inch to about 0.04 inch thick.

Golf balls 10, 20 and 30 made in accordance to the present disclosure can have a compression of greater than about 60 PGA, such as greater than about 80 or greater than about 90 PGA. These balls can exhibit CoR of at least 0.8 at 125 ft/s or at least 0.81 at 125 ft/s. These balls can also exhibit CoR of at least 0.75 at 160 ft/s or at least 0.76 at 160 ft/s.

As used herein, the term "polymer" is used to refer to oligomers, homopolymers, random copolymers, pseudo-copolymers, statistical copolymers, alternating copolymers, periodic copolymer, bipolymers, terpolymers, quaterpolymers, other forms of copolymers, substituted derivatives thereof, and mixtures thereof. These polymers can be linear, branched, block, graft, monodisperse, polydisperse, regular, irregular, tactic, isotactic, syndiotactic, stereoregular, atactic, stereoblock, single-strand, double-strand, star, comb, and/or dendritic.

Other than in the operating examples, or unless otherwise expressly specified, all of the numerical ranges, amounts, values, ratios, and percentages in the present disclosure may be read as if prefaced by the word "about" even though the term "about" may not expressly appear with the value, amount, ratio, percentage, or range. Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

As used herein, the terms "formed from" and "formed of" denote open, e.g., "comprising," claim language. As such, it is intended that a composition "formed from" or "formed of" a list of recited components be a composition comprising at least these recited components, and can further comprise other nonrecited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from 5% to 100% of complete crosslinking. In other examples, the crosslink density can range from 35% to 85% of full crosslinking. In other examples, the crosslink density can range from 50% to 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

While it is apparent that the illustrative examples of the disclosure disclosed herein fulfill the objectives stated above, it is appreciated that numerous modifications and other examples may be devised by those skilled in the art. One such modification is that the outer surface can be flush with the inner surface free ends or it can extend beyond the free ends. Furthermore, it is noted that any and all compositions disclosed herein may be used in any one or more golf ball portions present in any particular construction, such as the innermost center, inner core layer, intermediate core layer, outer core layer, intermediate layer, inner cover layer, intermediate cover layer, outermost cover layer, and the like and equivalents thereof. Therefore, it will be understood that the appended claims are intended to cover all such modifications and examples, which would come within the spirit and scope of the present disclosure.

I claim:

1. A golf ball comprising a core and a cover, wherein the core is formed from an elastomer composition comprising polybutadiene having a 1,4-trans content of greater than 70% and from 0.1 to 5 parts p-toluene sulfonyl isocyanate per 100 parts polybutadiene.

* * * * *